Aug. 12, 1924.

A. W. BROWN
LAWN MOWER
Filed Oct. 21, 1919

Inventor
A. W. Brown.

Aug. 12, 1924.

A. W. BROWN 1,504,863

LAWN MOWER

Filed Oct. 21, 1919      3 Sheets-Sheet 2

Inventor
A. W. Brown.

Aug. 12, 1924.

A. W. BROWN

LAWN MOWER

Filed Oct. 21, 1919

Inventor

A. W. Brown.

By Harry F. Riley

Attorney

Patented Aug. 12, 1924.

1,504,863

UNITED STATES PATENT OFFICE.

ALLEN W. BROWN, OF ST. LOUIS, MISSOURI, ASSIGNOR OF ONE-HALF TO FRANK E. McMILLIN, OF CHEVY CHASE, MARYLAND.

LAWN MOWER.

Application filed October 21, 1919. Serial No. 332,216.

*To all whom it may concern:*

Be it known that ALLEN W. BROWN, a citizen of the United States, residing at St. Louis, in the county of St. Louis City and State of Missouri, has invented certain new and useful Improvements in Lawn Mowers, of which the following is a specification.

This invention relates to lawn mowers.

The object of the present invention is to provide a simple, practical and efficient motor lawn mower of strong, durable and comparatively inexpensive construction, equipped with an internal combustion engine carried by the frame of the lawn mower and connected with the rotary cutting cylinder thereof and adapted to positively drive the same independently of the supporting or traction wheels of the lawn mower, whereby the cutting mechanism of the lawn mower may be driven by the internal combustion engine while the lawn mower is moved over the grass to be cut without the movement of the lawn mower by the operator interfering with or affecting the driving of the cutting cylinder by the internal combustion engine.

A further object of the invention is to provide a motor lawn mower of this character provided with means for connecting the internal combustion engine with one of the supporting or traction wheels of the lawn mower adapted to enable the internal combustion engine to be started by a forward movement of the lawn mower by the operator, and capable after the internal combustion engine has started of permitting the same to kick off from its connection with the supporting or traction wheel and operate independently thereof.

It is also an object of the invention to provide a motor lawn mower equipped with adjustable means for enabling gears of different diameters to be employed for varying the speed ratio to adapt the lawn mower for cutting grass and the like under varying conditions.

A further object of the invention is to arrange conveniently the controlling means of the internal combustion engine so that the feed of gas to the engine and the advancing and retarding of the spark may be effected by partially rotating means on the laterally extending grip members of the handle bar of the lawn mower.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several Figures:—

Figures 4 and 5 are detail sectional views illustrating the manner of mounting and securing the adjustable bracket for enabling gears of different diameters to be arranged on the drive or crank shaft of the engine for varying the speed ratio.

Figure 6 is a detail sectional view of the handle of the lawn mower, illustrating the manner of mounting the adjustable sleeves.

Figure 1:
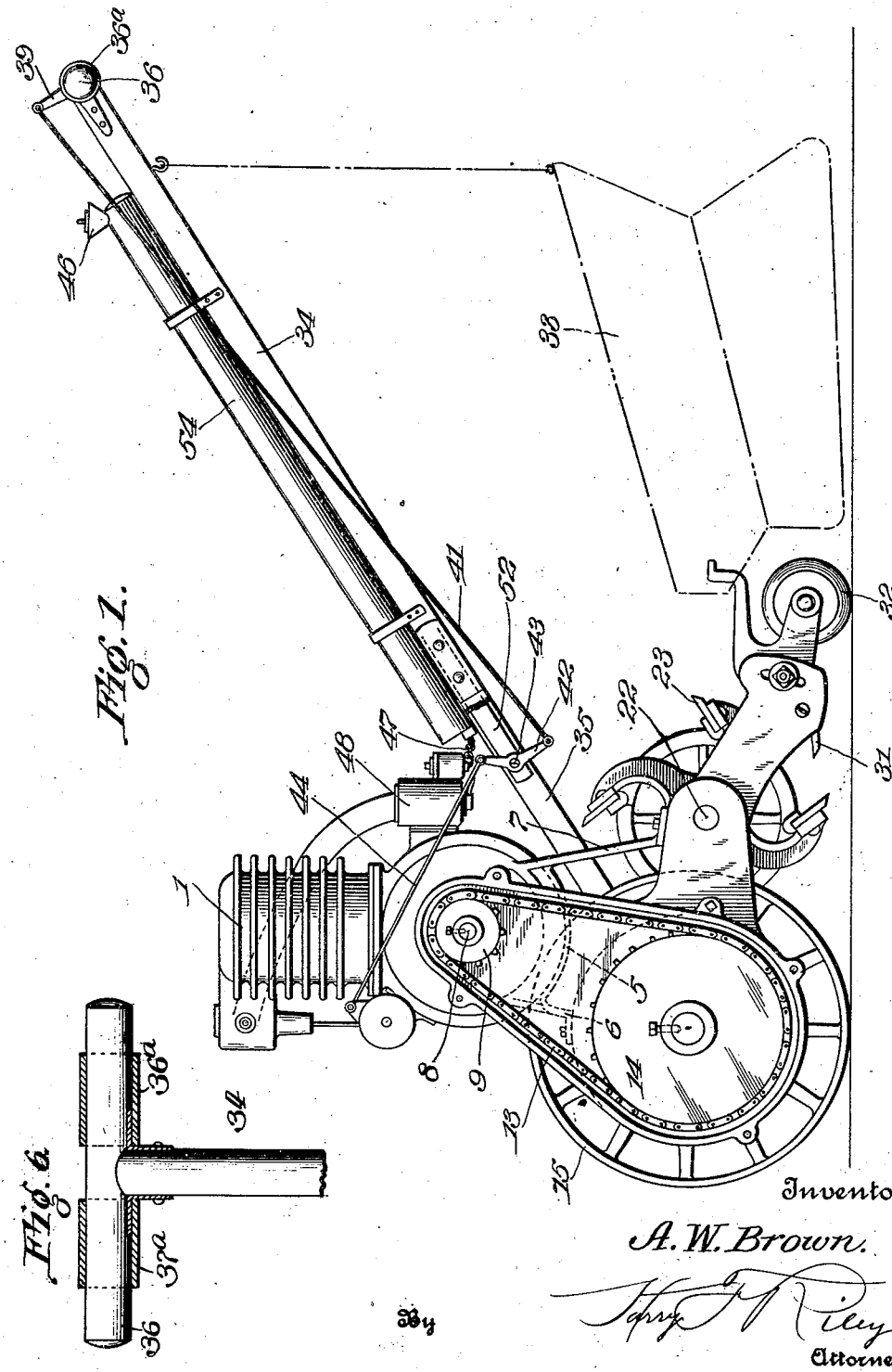
Figure 1 is a side elevation of a motor lawn mower constructed in accordance with this invention, the cap or cover plate of the sprocket gearing being removed to show the lever and the clutch of the sprocket pinion.
Figure 2:
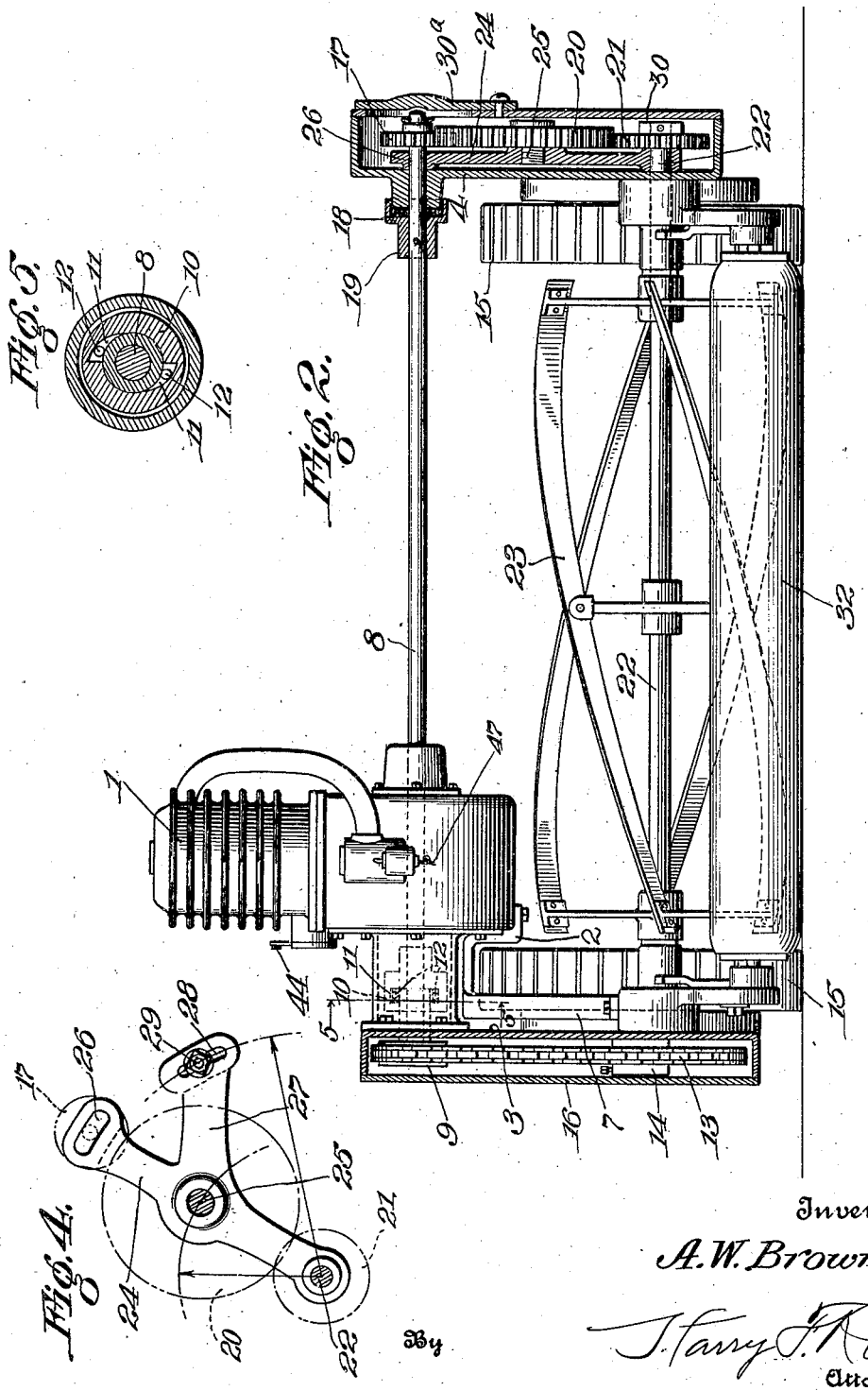
Figure 2 is a front elevation, parts being omitted, and the caps or cover plates being in section to illustrate the starting and driving mechanism more clearly.
Figure 3:
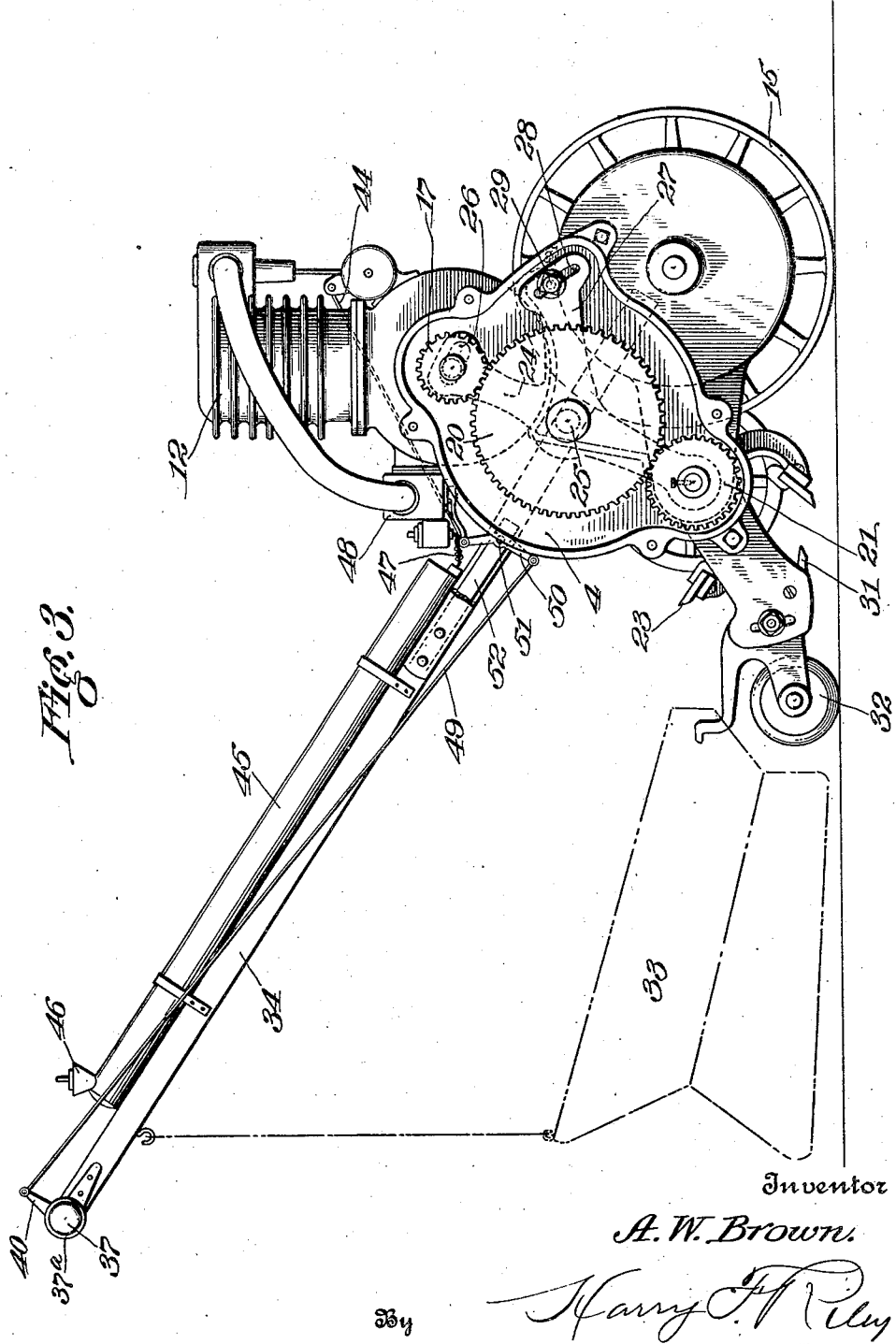
Figure 3 is a side elevation showing the other side of the machine, the cap or cover plate of the spur gearing being removed.

In the accompanying drawing, in which is illustrated the preferred embodiment of the invention, 1 designates an internal combustion engine of the ordinary construction mounted on a stand or bracket 2, which is suitably secured to one of the side plates of the frame of a lawn mower. The lawn mower may be of any preferred type and the frame comprises side plates 3 and 4 and suitable connecting means, and any desired form of frame may, of course, be employed. The stand or bracket 2 is shown applied to the side plate 3 and it consists of an intermediate curved portion or seat 5 and legs or braces 6 and 7 arranged at the ends of the intermediate portion or seat 5 which presents an upper concave face to the crank case of the internal combustion engine. The internal combustion engine is of the usual type and as various makes of internal combustion engines may be employed, a specific description of the particular construction of the engine is deemed unnecessary. The crank shaft or power shaft 8 of the engine extends across the frame of the machine and is journaled in suitable bearings thereof, and one end carries a sprocket pinion 9 which is connected with the shaft by a ball clutch 10 arranged on the shaft at the inner side of the pinion and having tapered recesses 11 receiving balls 12. A sprocket chain 13 is trained over the sprocket pinion and is arranged on a sprocket wheel 14 which is connected with one of the supporting or traction wheels 15 of the lawn mower. A clutch may or may not be employed in the connection between the sprocket wheel 14 and the supporting or carrying wheel 15 and the sprocket gear is designed only for starting the internal combustion engine. When the lawn mower is pushed forward by the operator for starting the internal combustion engine, the supporting or traction wheel 15 rotates forwardly, and the sprocket pinion 9 rotates in the same direction, as indicated by the arrow in the said figure. This causes the ball clutch to connect the crank or power shaft with the sprocket gearing, and the power shaft is rotated for starting the internal combustion engine. As soon as the internal combustion engine is started, the engine speed will be far superior to the rotation of the sprocket wheel on the crank or power shaft, due to the pushing of the lawn mower over the grass and the sprocket pinion 9 will operate as an idler and will not affect the rotation of the crank or power shaft when the motor is in operation. The sprocket gearing is housed within a cap or cover plate 16, which may be secured to the adjacent side plate of the frame of the lawn mower in any desired manner, and which is readily removable to afford access to the sprocket gearing.

The other end of the power shaft 8 has detachably or otherwise secured to it a driving pinion 17 which may be mounted in any desired manner. The power shaft is shown journaled in the side plate 4 of the frame of the lawn mower. This detachable connection of the pinion 17 provides a convenient means for enabling one driving pinion to be substituted for another for changing the speed ratio of the lawn mower, but any other suitable means may, of course, be employed.

The pinion 17 meshes with a master gear 20 which also meshes with a sprocket pinion 21 keyed or otherwise secured to the shaft 22 of the cutting cylinder 23. The shaft 22 of the cutting cylinder 23 is journaled in suitable bearings of the frame of the lawn mower and the pinions 17 and 21 are preferably constructed of steel, while the master gear is designed to be made of bronze, but any other suitable material may, of course, be employed in the construction of the gears. The packing 18 is arranged within a thrust collar 19 secured to the shaft 8. In order to enable gears of different diameters to be mounted on the crank or power shaft 8, the master gear 20 is carried by an adjustable bracket 24 having a suitable stub shaft 25 for the master gear and pivoted at its lower end by the shaft 22 and provided at its upper end with an arcuate slot 26 through which passes the power shaft. The bearing bracket 24 is provided with an angularly related arm 27 having an arcuate slot 28 through which passes a clamping bolt 29 mounted on the adjacent side plate 4 and adapted to secure the adjustable bracket 24 at any adjustment within the limit of its pivotal movement. This will permit a pinion 17 of the desired diameter to be arranged in mesh with the master gear for obtaining the desired speed or power for cutting grass under varying conditions. The spur gearing is arranged within a suitable cap or cover plate 30 which may be secured to the side plate 4 in any desired manner and which is provided opposite the pinion 17 with a pivoted plate or section 30$^a$ to afford access to the gear 17 to enable the same to be removed and changed for a gear of different diameter without taking off the cap plate or housing 30.

The lawn mower is equipped with a stationary plate 31 to cooperate with the rotary cutting cylinder, and it is also provided with an adjustable roller 32. The roller is adjusted in the usual manner, and a grass bag or receptacle 33 is arranged to receive the severed grass.

The lawn mower is equipped with a handle 34 connected with the frame of the lawn mower by suitable braces 35 and provided with rigid laterally extending grip portions 36 and 37 on which sleeves 36$^a$ and 37$^a$ are mounted for rotary movement, and the said sleeves are equipped with arms 39 and 40. The arm 39 is connected by a rod 41 with one arm of an angle lever 42 pivoted at an intermediate point at 43 on a supporting arm 52 of the handle 34 and connected by a rod 44 with the sparking controlling means. The other arm 40 is connected by a rod 49 with one arm of a lever 50 fulcrumed at 51 on the arm or extension 52 of the handle at the opposite side from which the lever 42 is fulcrumed.

The supporting arm 52 of the handle is preferably an extension or piece held between the handle and one of the braces 35, but any other suitable means may, of course, be provided for mounting the levers and the gas spark controlling mechanism. The sleeves 36$^a$ and 37$^a$ which are arranged adjacent to the handle 34 so as to be out of the way of the operator in the manipulation or guiding of the lawn mower, are preferably provided with milled outer portions to enable them to be readily grasped for operation, and in practice, suitable graduations will be provided for indicating the amount of movement or adjustment of the sleeves, and any suitable means may be employed for retaining the spark and gas controlling means in the desired adjustment.

The handle 34 carries a longitudinal gasoline tank 45 provided at the upper end with a flanged filling aperture 46 and connected at its lower end by a suitable flexible tube 47 with the carburetor 48 of the internal combustion engine. By this arrangement, the lawn mower may be readily moved without material effort over the grass to be cut, and the speed of the engine may be easily controlled without removing the hands from the laterally projecting grooves of the handle bar.

The changing of the gear 17 not only provides for operation of the lawn mower at different speeds and with variable power, but this feature enables the law mower to be readily sharpened without removal of the blades from the cylinder or the removal of the stationary blade from the supporting means. The stationary blade, which is adjustable in the usual manner, is adapted to be properly set to cause the blades of the cylinder to operate with a grinding or sharpening action on themselves on the stationary blade, and for this purpose, it is designed to operate the engine at an exceedingly slow speed, and to apply a mixture of flour, emery and oil to the blades. A slow movement of the blades of the cylinder over the stationary cutter or blade will whet the blades to a sharp edge and if desired, the lawn mower may be left unattended with the engine running at a slow speed, while the sharpening operation is effected. After the lawn mower has been sharpened, the blades are wiped off, and the machine is ready for use.

What is claimed is:—

1. A motor lawn mower, including a lawn mower having supporting wheels and provided with cutting mechanism, an internal combustion engine carried by the lawn mower, driving gearing connecting the internal combustion engine with the cutting mechanism for actuating the latter, starting mechanism comprising engine cranking gearing connecting the internal combustion engine with one of the supporting wheels, and an automatic clutch device in the latter gearing having means arranged to transmit motion from the supporting wheel of the lawn mower to the engine and to automatically unclutch the said wheel from the engine when the speed of the latter exceeds the speed of the supporting wheel, whereby the engine may be started by pushing the lawn mower and when started will automatically operate only the cutting mechanism without manual operation of the clutch.

2. A motor lawn mower, including a lawn mower having supporting wheels and provided with cutting mechanism, an internal combustion engine carried by the lawn mower, driving gearing connecting the internal combustion engine with the cutting mechanism for actuating the latter, and cranking mechanism comprising a sprocket wheel connected with one of the supporting wheels, a sprocket pinion connected with the internal combustion engine, a sprocket chain arranged on the sprocket wheel and sprocket pinion, and an automatic clutch in the cranking mechanism arranged to transmit motion from the supporting wheel to the engine and to unclutch the said wheel from the engine when the speed of the engine exceeds that of the supporting wheel of the lawn mower, whereby the engine may be started by pushing the lawn mower and when started will automatically drive only the cutting mechanism without manual manipulation of clutch mechanism.

3. A motor lawn mower, comprising a lawn mower including a side plate, supporting wheels and cutting mechanism, an internal combustion engine carried by the lawn mower and provided with a crank shaft, driving gearing for connecting the crank shaft with the cutting mechanism, cranking mechanism comprising sprocket gearing arranged at the outer face of the said plate and connected with one of the supporting wheels, and an automatic clutch arranged at the inner face of the side plate and connected with the sprocket gearing and with the crank shaft of the engine and having means to transmit motion from the supporting wheel to the crank shaft and to unclutch the supporting wheel from the crank shaft when the speed of the engine exceeds that of the supporting wheel of the lawn mower, whereby the engine may be started by pushing the lawn mower and when started will automatically drive only the cutting mechanism without manual operation of the clutch.

4. A motor lawn mower, comprising a lawn mower including a supporting wheel, a side plate and cutting mechanism, an internal combustion engine having a crank shaft, a stand mounted on the side plate and supporting the internal combustion engine, driving gearing permanently connecting the crank shaft with the cutting mechanism, cranking mechanism consisting of sprocket gearing mounted on the side plate and connected with the supporting wheel, and an automatic clutch connecting the sprocket gearing with the crank shaft and having means to transmit motion from the supporting wheel to the crank shaft and to unclutch the crank shaft from the supporting wheel when the speed of the engine exceeds that of the supporting wheel of the lawn mower, whereby the engine may be started by pushing the lawn mower and when started will automatically drive only the cutting mechanism without manual operation of the clutch.

5. A motor lawn mower, comprising a lawn mower including supporting wheels and cutting mechanism, an internal combustion engine carried by the lawn mower and having a crank shaft extending across the said lawn mower, cranking mechanism comprising sprocket gearing arranged at one side of the lawn mower and connected with the supporting wheel, driving spur gearing located at the other side of the lawn mower and permanently connecting the cutting mechanism with the crank shaft, and an automatic clutch connecting the sprocket gearing with the crank shaft and having means arranged to transmit motion from the supporting wheel to the crank shaft and to unclutch the supporting wheel from the crank shaft when the speed of the engine exceeds that of the supporting wheel of the lawn mower, whereby the engine may be started by pushing the lawn mower and when started will automatically actuate only the cutting mechanism without manual operation of the clutch.

6. A motor lawn mower, comprising a lawn mower including supporting wheels and a rotary cutting cylinder, an internal combustion engine carried by the lawn mower and arranged at one side thereof and having a crank shaft extending across the lawn mower, driving spur gearing located at one side of the lawn mower permanently connecting the crank shaft with the cutting cylinder, cranking mechanism comprising sprocket gearing located at the other side of the lawn mower and connected with the supporting wheel, and an automatic clutch device connecting the crank shaft with the sprocket gearing and having means arranged to transmit motion from the supporting wheel to the crank shaft and to unclutch the supporting wheel from the crank shaft when the speed of the engine exceeds that of the supporting wheel of the lawn mower, whereby the engine may be cranked by pushing the lawn mower and when started will automatically operate only the cutting mechanism without manual operation of the clutch.

7. A motor lawn mower including a lawn mower having a cutting cylinder, an internal combustion engine provided with a crank shaft, pinions connected with the crank shaft and with the cylinder, one of the pinions being detachable to permit pinions of different diameters to be used to vary the speed ratio, and an adjustable master gear meshing with the pinions of the crank shaft and the cutting cylinder.

8. A motor lawn mower including a lawn mower having a rotary cutting cylinder provided with a shaft, an internal combustion engine having a crank shaft, pinions mounted on the said shafts, the pinion of the crank shaft being detachable to enable pinions of different diameters to be used to vary the speed ratio, and an adjustable master gear meshing with the said pinions.

9. A motor lawn mower including a lawn mower having a rotary cutting cylinder provided with a shaft, an internal combustion engine having a crank shaft, pinions mounted on the said shafts, the pinion of the crank shaft being detachable to enable pinions of different diameters to be used to vary the speed ratio, a master gear meshing with the said pinions, an adjustable bracket carrying the master gear, and means for clamping the bracket in its adjustment.

10. A motor lawn mower including a lawn mower having a rotary cutting cylinder provided with a shaft, an internal combustion engine having a crank shaft, pinions mounted on the said shafts, the pinion of the crank shaft being detachable to enable pinions of different diameters to be used to vary the speed ratio, a master gear meshing with the said pinions, an adjustable bracket carrying the master gear and pivoted on the cylinder shaft and provided with a slot or opening receiving the crank shaft, and means for clamping the bracket in its adjustment.

11. A motor lawn mower including a lawn mower having a rotary cutting cylinder provided with a shaft, an internal combustion engine having a crank shaft, pinions mounted on the said shafts, the pinion of the crank shaft being detachable to enable pinions of different diameters to be used to vary the speed ratio, a master gear meshing with the said pinions, an adjustable bracket carrying the master gear and pivoted on the cylinder shaft and provided with a slot or opening receiving the crank shaft, said bracket being also provided with an arm having a slot and a clamping bolt operating in the slot of the arm for securing the bracket in its adjustment.

12. A motor lawn mower, comprising a lawn mower including supporting wheels and a rotary cutting cylinder, an internal combustion engine carried by the lawn mower, driving gearing permanently connecting the engine with the cutting cylinder, cranking mechanism comprising other gearing connecting the engine with one of the supporting wheels, and an automatic clutch device in the latter gearing having means arranged to transmit motion from the supporting wheel to the internal combustion engine and to unclutch the supporting wheel from the engine when the speed of the engine exceeds that of the supporting wheel of the lawn mower, whereby the engine may be cranked by pushing the lawn mower and when cranked will automatically drive only the cutting mechanism without manual operation of the clutch.

13. A motor lawn mower including a lawn mower having a handle having fixed grip portions, an internal combustion engine connected with the cutting mechanism of the lawn mower, and spark and gas controlling means located at opposite sides of the handle and comprising rotary sleeves mounted on the grip portions of the handle adjacent the latter.

14. A motor lawn mower including a lawn mower, and having a handle provided with fixed laterally extending grip portions, an internal combustion engine mounted on the lawn mower, a supporting arm carried by the handle, levers mounted on the supporting arm and connected with the carburetor and the spark controlling mechanism of the internal combustion engine, sleeves arranged on the grip portions of the handle adjacent the latter and provided with arms, and connecting means extending from the arms of the sleeves along the handle to the said levers.

15. A motor lawn mower, comprising a lawn mower including supporting wheels, an internal combustion engine carried by the lawn mower, cranking mechanism comprising gearing connecting the internal combustion engine with the supporting wheel, and an automatic clutch in the said gearing having means arranged to transmit motion from the supporting wheel to the engine and to unclutch the supporting wheel from the engine when the speed of the engine exceeds that of the supporting wheel of the lawn mower, whereby the engine may be cranked by pushing the lawn mower and when started will operate automatically independently of the supporting wheel without manual operation of the clutch.

In testimony whereof I affix my signature.

ALLEN W. BROWN.